(12) United States Patent
Lu et al.

(10) Patent No.: US 7,567,013 B2
(45) Date of Patent: Jul. 28, 2009

(54) VIBRATION POWER GENERATION

(75) Inventors: Liangju Lu, Eden Prairie, MN (US);
Swapan Chakraborty, Shakopee, MN (US); John McIntire, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/891,855

(22) Filed: Aug. 13, 2007

(65) Prior Publication Data
US 2008/0036307 A1 Feb. 14, 2008

Related U.S. Application Data

(60) Provisional application No. 60/837,566, filed on Aug. 14, 2006.

(51) Int. Cl.
*H01L 41/113* (2006.01)
*H01L 41/08* (2006.01)

(52) U.S. Cl. ........................ 310/319; 310/339
(58) Field of Classification Search ............... 310/319, 310/338, 339
See application file for complete search history.

(56) References Cited

U.S. PATENT DOCUMENTS

| | | | |
|---|---|---|---|
| 2,895,063 A | 7/1959 | Morris | 310/15 |
| 3,539,841 A * | 11/1970 | Riff | 310/339 |
| 3,568,704 A | 3/1971 | Campagnuolo et al. | 310/15 |
| 3,663,845 A | 5/1972 | Apstein | 310/15 |
| 3,798,475 A | 3/1974 | Campagnuolo et al. | 310/15 |
| 3,878,716 A | 4/1975 | Asada | 73/194 |
| 4,005,319 A | 1/1977 | Nilsson et al. | 310/339 |
| 4,148,215 A | 4/1979 | Hofstetter, Jr. | 73/54.23 |
| RE31,217 E | 4/1983 | Rodely | 73/861.22 |

(Continued)

FOREIGN PATENT DOCUMENTS

DE 296 18 105 2/1997

(Continued)

OTHER PUBLICATIONS

The International Search Report and Written Opinion from Application No. PCTUS2007/017926, filed Aug. 13, 2007.

(Continued)

*Primary Examiner*—Thomas M Dougherty
(74) *Attorney, Agent, or Firm*—Christopher R. Christenson; Westman, Champlin & Kelly, P.A.

(57) ABSTRACT

Vibration-based electrical power generation is provided. In one aspect, a vibration-based power generator is embodied within a machine dampener and includes an electromotive power generation module and a piezoelectric power generation module. A power storage device is operably coupled to the electromotive power generation module and the piezoelectric power generation module. In another aspect, a device for generating electrical energy based is provided. The device includes a housing operably coupleable to a source of vibration. The housing defines a chamber inside. A first circular permanent magnet is located within the chamber and has an outer diameter. A ring-type permanent magnet is located around the first circular permanent magnet and defines an annular space therebetween. At least one voice coil portion is located in the annular space and is coupled to a flexure structure to allow the voice coil portion(s) to move within the flux of the permanent magnets in response to vibration.

16 Claims, 6 Drawing Sheets

U.S. PATENT DOCUMENTS

| | | | |
|---|---|---|---|
| 4,491,738 A | 1/1985 | Kamp | 290/43 |
| 5,707,215 A * | 1/1998 | Olney et al. | 417/233 |
| 5,965,968 A | 10/1999 | Robert et al. | 310/310 |
| 6,127,765 A | 10/2000 | Fushinobu | 310/306 |
| 6,127,812 A | 10/2000 | Ghezzo et al. | 320/166 |
| 6,315,813 B1 | 11/2001 | Morgan et al. | 95/23 |
| 6,470,755 B1 | 10/2002 | Beachey et al. | 73/756 |
| 6,593,666 B1 | 7/2003 | Pinkerton | 290/1 R |
| 6,595,006 B2 | 7/2003 | Thiesen et al. | 62/6 |
| 6,651,511 B1 | 11/2003 | Young | 73/861.08 |
| 6,713,942 B2 | 3/2004 | Raman et al. | 310/316.01 |
| 6,737,789 B2 * | 5/2004 | Radziemski et al. | 310/339 |
| 6,975,043 B2 | 12/2005 | Schumacher et al. | 290/1 |
| 2002/0036448 A1 | 3/2002 | Kageyama et al. | 310/348 |
| 2005/0017602 A1* | 1/2005 | Arms et al. | 310/339 |
| 2008/0054638 A1* | 3/2008 | Greene et al. | 290/1 R |

FOREIGN PATENT DOCUMENTS

| | | |
|---|---|---|
| DE | 199 29 341 | 12/2000 |
| DE | 10247387 A1 * | 10/2002 |
| DE | 102 05 531 A1 | 8/2003 |
| EP | 1 071 195 A2 | 1/2001 |
| FR | 2 872 868 | 1/2006 |
| GB | 2111680 | 7/1983 |
| GB | 2119514 | 11/1983 |
| GB | 2121185 | 12/1983 |
| GB | 2142725 | 1/1985 |
| WO | WO 02/095908 | 5/2002 |
| WO | WO 03/056691 A1 | 10/2003 |
| WO | WO 03/056692 A1 | 10/2003 |
| WO | WO 06/046937 | 5/2006 |

OTHER PUBLICATIONS

"Green" Eureka, Findlay Publications Ltd., vol., 20, No. 10, Oct. 2000, pp. 30-31.

* cited by examiner

VIBRATION POWER GENERATION

CROSS-REFERENCE TO RELATED APPLICATION

The present application is based on and claims the benefit of U.S. provisional patent application Ser. No. 60/837,566, filed Aug. 14, 2006, the content of which is hereby incorporated by reference in its entirety.

BACKGROUND

Many industrial or business operations utilize electrical, mechanical, pneumatic, or some combination thereof, machinery. Examples of such machinery include electrical motors, turbines, et cetera. Typically, it is desirable to dampen, or otherwise attenuate, any vibrations generated by such machinery. Reducing the vibration of machinery generally reduces the noise of the machinery, as well as the mechanical wear that components disposed on or near the machinery undergo due to the acceleration caused by the vibration. Vibration dampeners in the form of pads or springs have been used in a variety of industries including, for example, heavy machinery, buildings, automotive vehicles, process industries, et cetera. These dampeners/pads/springs typically reduce, at least to some extent, the vibration, by transforming some of the mechanical motion's energy into the dampener and ultimately to thermal energy.

While typically vibration dampening is considered essential for many situations, the mechanical energy translated into the dampener is essentially lost. Providing an improved device, structure or system that could couple to a source of mechanical vibration and generate useful energy would be highly desirable.

SUMMARY

Vibration-based electrical power generation is provided. In one aspect, a vibration-based power generator is embodied within a machine dampener and includes an electromotive power generation module and a piezoelectric power generation module. A power storage device is operably coupled to the electromotive power generation module and the piezoelectric power generation module. In another aspect, a device for generating electrical energy based is provided. The device includes a housing operably coupleable to a source of vibration. The housing defines a chamber inside. A first circular permanent magnet is located within the chamber and has an outer diameter. A ring-type permanent magnet is located around the first circular permanent magnet and defines an annular space therebetween. At least one voice coil portion is located in the annular space and is coupled to a flexure structure to allow the voice coil portion(s) to move within the flux of the permanent magnets in response to vibration.

DETAILED DESCRIPTION OF ILLUSTRATIVE EMBODIMENTS

Vibration is one of the great sources of renewable energy. Energy density generated from vibration can vary from 10 $\mu W/cm^3$ to 800 $\mu W/cm^3$ depending on the driving frequency, which ranges from the Hz to kHz range, and depending on amplitude/displacement of the vibrations. For example, consider a vibration providing an average energy density of 500 $\mu W/cm^3$. A small pump of length 3 feet, width 3 feet, and height of 3 feet can produce 400 watts of electrical power. In process industries, and related other industries, heavy machinery and engines used by such industries are typically much heavier and occupy several thousand square feet of area. The vibration of such machines could produce significantly greater power.

Embodiments of the present invention generally provide a device that couples to a source of mechanical vibration and transforms at least a portion of the mechanical vibration into useable electricity. In some embodiments, the device is itself a vibration dampener while in other embodiments, the device is simply attached to the source of vibration.

Figure 1:
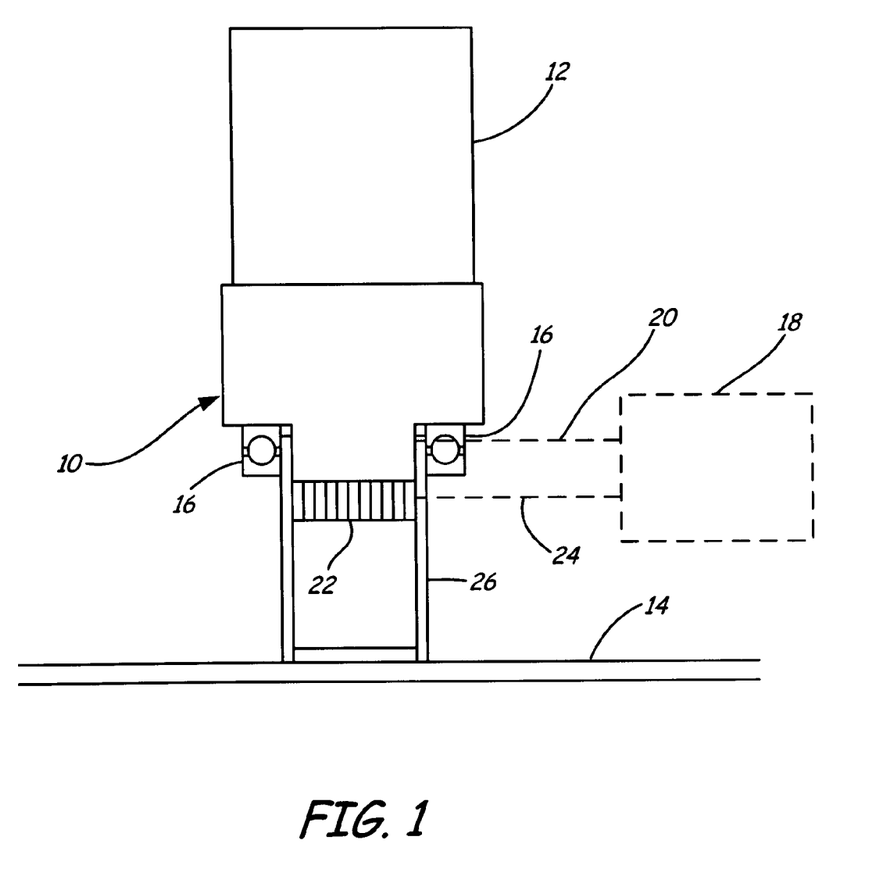
FIG. 1 is a diagrammatic view of a machine vibration dampener in accordance with an embodiment of the present invention.

FIG. 1 is a diagrammatic view of a machine vibration dampener in accordance with an embodiment of the present invention. Dampener 10 is coupled to source 12 of vibration. Source 12 may be any type of machinery or apparatus that generates a vibration for which dampening is desired. For example, machine 12 may be a pump, a motor, a turbine, or any other mechanical system undergoing mechanical vibration. Dampener 10 couples machine 12 to floor 14 and is configured to translate at least some of the mechanical energy from source 12 into electricity. Dampener 10 includes an electromotive vibration generation module 16 that is coupled to source or load 18 via connection 20. Additionally, dampener 10 also includes a second generation module 22 that is preferably a piezoelectric generation module which is coupled to load or storage device 18 via line 24. As set forth herein, a hybrid vibration-based generator includes a generator that generates electrical energy using at least two different types of generation. The example given above is a hybrid vibration-based generator by virtue of using both electromotive and piezoelectric based generation modules. However, a hybrid vibration-based generator would also include an electromotive generation module working in conjunction with a thermal generation module.

In accordance with an embodiment of the present invention, the vibration-based electrical generation modules are embedded within dampener 10. One advantage of such a hybrid approach is that for the electromotive generator, the generated power is directly proportional to the frequency of the oscillation. For piezoelectric-based generation, the generated power is directly proportional to the acceleration produced by the applied force, but is inversely proportional to the frequency. Using the hybrid approach, power can be generated for both high and low frequency applications. As illustrated in FIG. 1, dampener 10 is a piston-type vibration dampener. Dampener 10 is considered a piston-type dampener in that at least some of the mechanical vibration is channeled within cylindrical sidewall 26.

Figure 2:
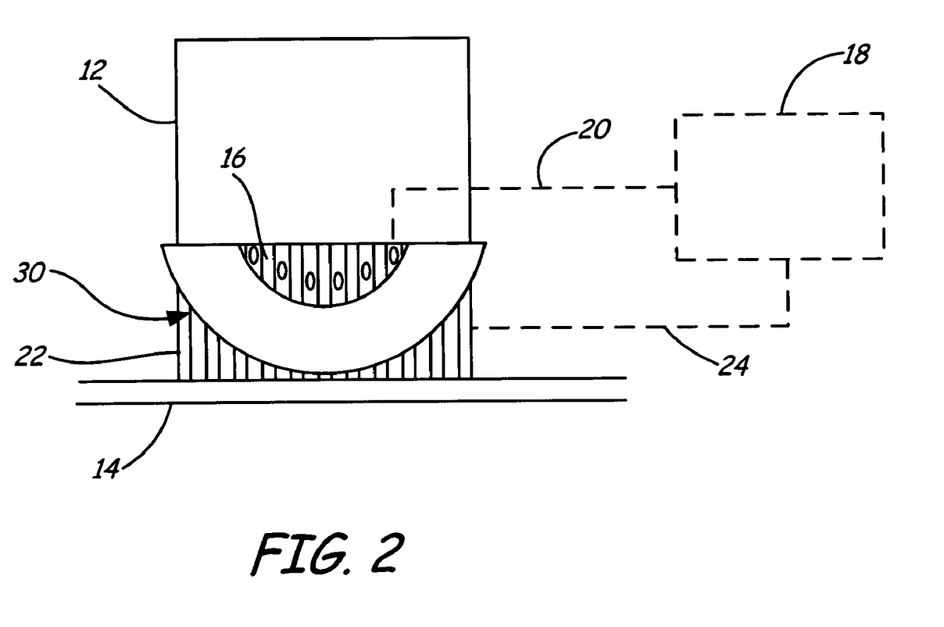
FIG. 2 is a diagrammatic view of a bar-type vibration dampener in accordance with an embodiment of the present invention.

FIG. 2 is a diagrammatic view of a bar-type vibration dampener in accordance with an embodiment of the present invention. The embodiment illustrated in FIG. 2 is somewhat similar to the embodiment illustrated in FIG. 1, and like components are numbered similarly. As illustrated in FIG. 2, bar-type dampener 30 is coupled to source 12 of vibration as well as floor 14. Dampener 30 includes, or has embedded therein, both electromotive generator 16, and piezoelectric generator 22. Electromotive generator 16 is coupled to load/storage device 18 via line 20. Similarly, piezoelectric generator 22 is coupled to load/storage device 18 via line 24.

While FIGS. 1 and 2 illustrate piston-type and bar-type vibration dampeners, respectively, other vibration dampeners can be modified to include the hybrid electrical generation features described with respect to FIGS. 1 and 2.

Figure 3:
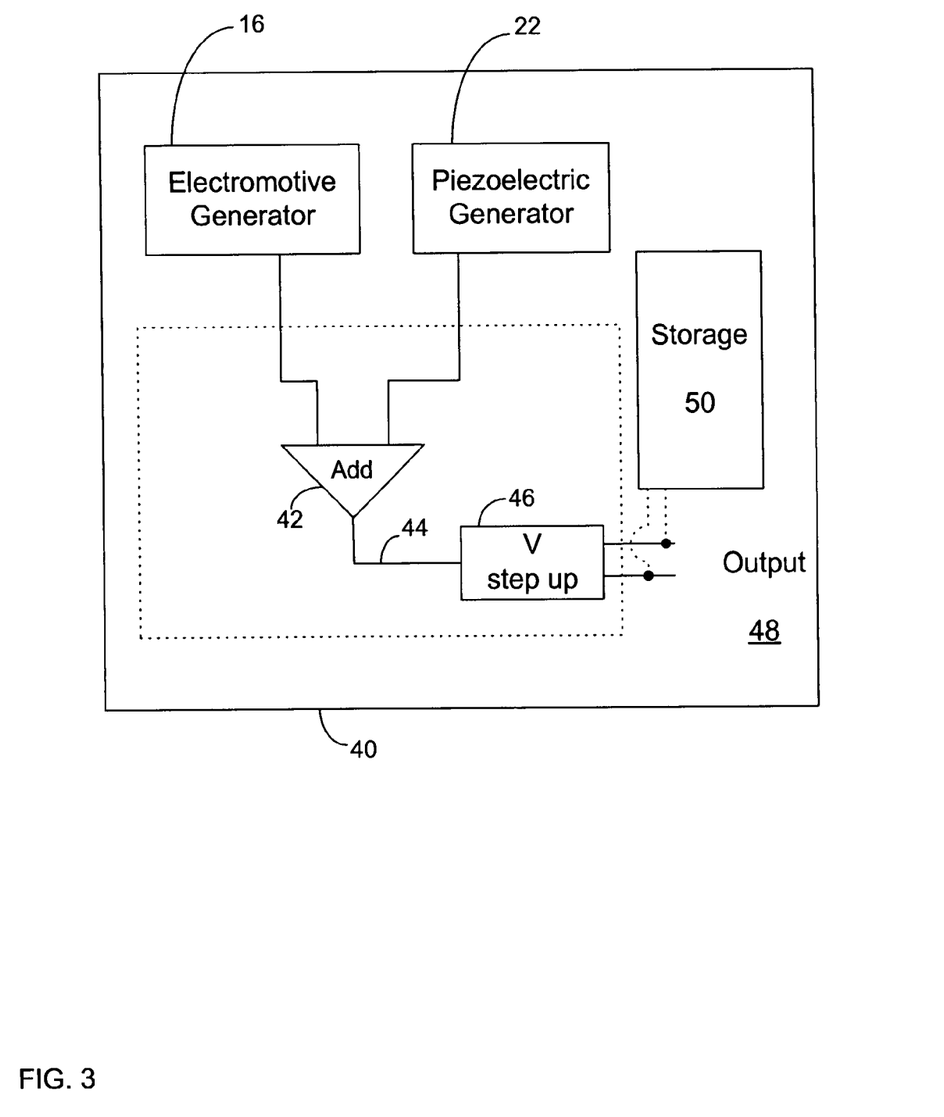
FIG. 3 is a block diagram of a circuit used in conjunction with embodiments of the present invention.

FIG. 3 is a block diagram of a circuit used in conjunction with embodiments of the present invention. Circuit 40 includes, or is coupled to, each of electromotive generator 16 and piezoelectric generator 22. Generators 16, 22 are coupled to additive circuitry 42 which generates an output 44 that is the sum of all electrical energy generated by generator 16 and 22. Output 44 is provided as an input to step-up voltage converter 46, which increases the voltage of input 44 to a higher level. The output of voltage step-up converter 46 can be coupled directly to an output load or device, as indicated at label 48, or to storage device 50. Alternatively, the output of step-up voltage converter 46 can be provided to both storage device 50 and output 48. Storage device 50 includes any component that is able to store electrical energy for some period of time. Suitable examples of storage device 50 include rechargeable batteries, capacitors, and the like.

Electromotive generator 16 utilizes motion induced by the vibration in the presence of a permanent magnetic field to generate electricity. Accordingly, various structures may be used to form electromotive generator 16. However, one particular example will be provided later in the specification (with respect to FIG. 6). Piezoelectric generator 22 includes any device that operates in accordance with the piezoelectric effect wherein an electric charge is generated by a material in response to applied mechanical stress. A variety of materials that generate this effect are known, including the known PZT (lead zirconate titanate) ceramic. It is believed that using the hybrid-based generation can provide several hundred watts of electrical power that can be extracted from machine vibration, which energy would otherwise simply be wasted.

It is expressly contemplated that the maximum amount of power that may be derived, in some circumstances, from the mechanical vibration energy may be insufficient to power the attached device or devices in a steady-state fashion. Accordingly, embodiments of the present invention provide the ability to store up electrical energy and operate attached devices for short periods or bursts of time.

Figure 4:
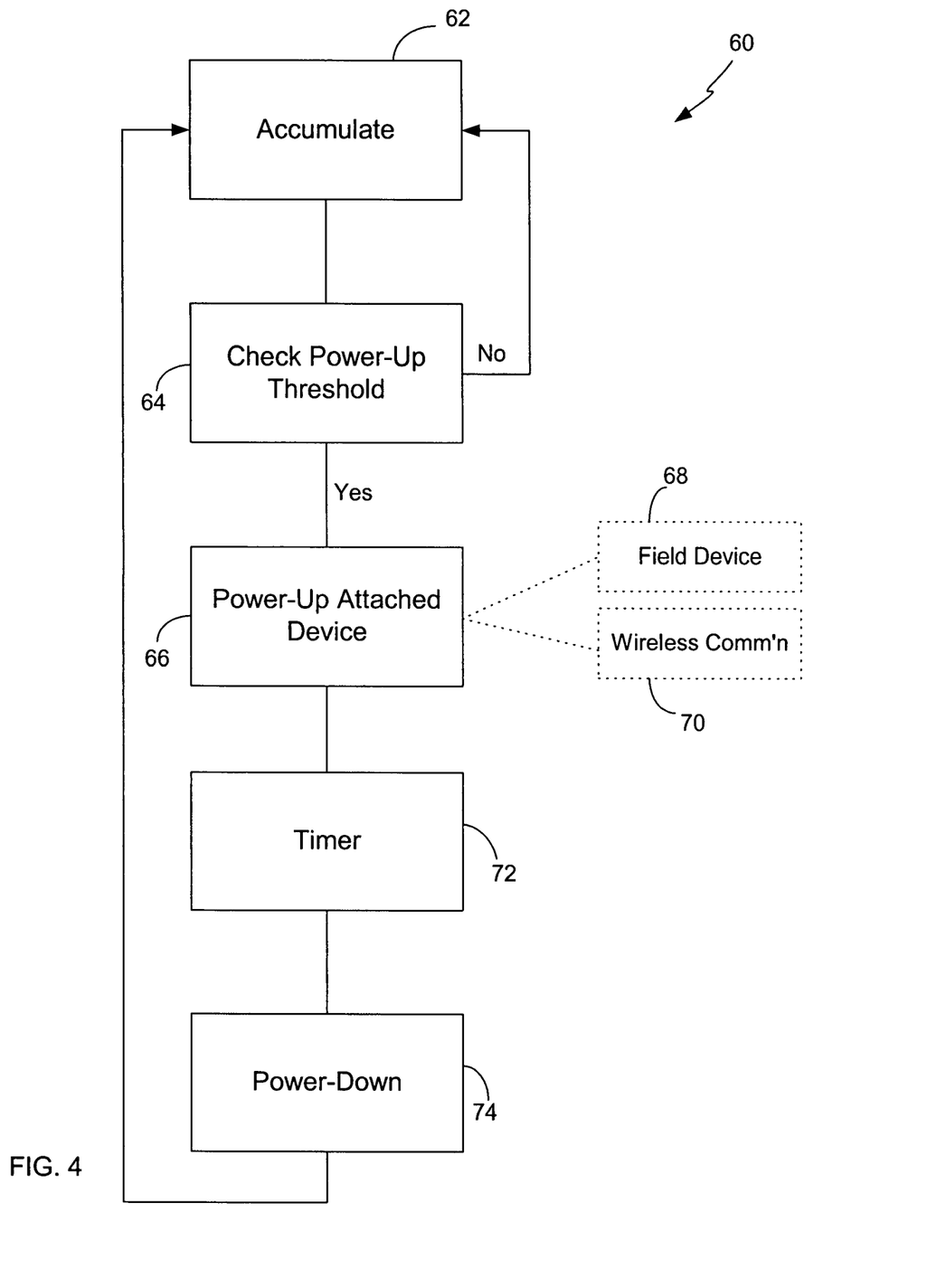
FIG. 4 is a method of storing electrical energy and operating at least one attached device for short period in accordance with an embodiment of the present invention.

FIG. 4 is a block diagram of such operation. Method 60 begins at block 62 where one or more vibration-based generators accumulate electrical energy. At block 64, a threshold is checked to determine whether sufficient energy has been accumulated. This check can be done by examining the amount of energy stored in a storage device, such as a rechargeable battery and/or capacitor, or simply determining if a pre-selected amount of time has elapsed while energy is accumulated at block 62. If the threshold has not been reached, control returns to block 62 and energy continues to accumulate. However, if the threshold has been reached, control passes to block 66 where one or more attached devices are powered up. Examples of attached devices include field device 68 and wireless communication device 70. Typical field devices include pressure, temperature, level or flow transmitters or valves. The wireless communication device 70 may be part of a field device or a separate device for connection to a field device. However, any other suitable devices may be used. At block 72, a timer is engaged to begin timing the initiation of the attached devices. Once timer 72 has determined that a selected amount of time has elapsed, control passes to block 74 where the attached device(s) are powered down. It should be noted that block 72 could be replaced with an alternate arrangement wherein the power available from the storage device (described with respect to FIG. 3) is monitored, and the device(s) are shutdown when the available power level drops below a certain threshold.

Hybrid generation in accordance with embodiments of the present invention provides unique opportunities to perform diagnostics based upon the vibration itself. Accordingly, these devices are able to derive all of their operating electricity from the mechanical vibrations, while simultaneously providing diagnostic abilities relative to that vibration. This can be particularly important for industrial applications. For example, if the vibration stops or slows down, it may suggest that the industrial application has some sort of problem. Similarly, if the vibration frequency and/or amplitude increases significantly, it may also be indicative of a problem with the application.

Figure 5:
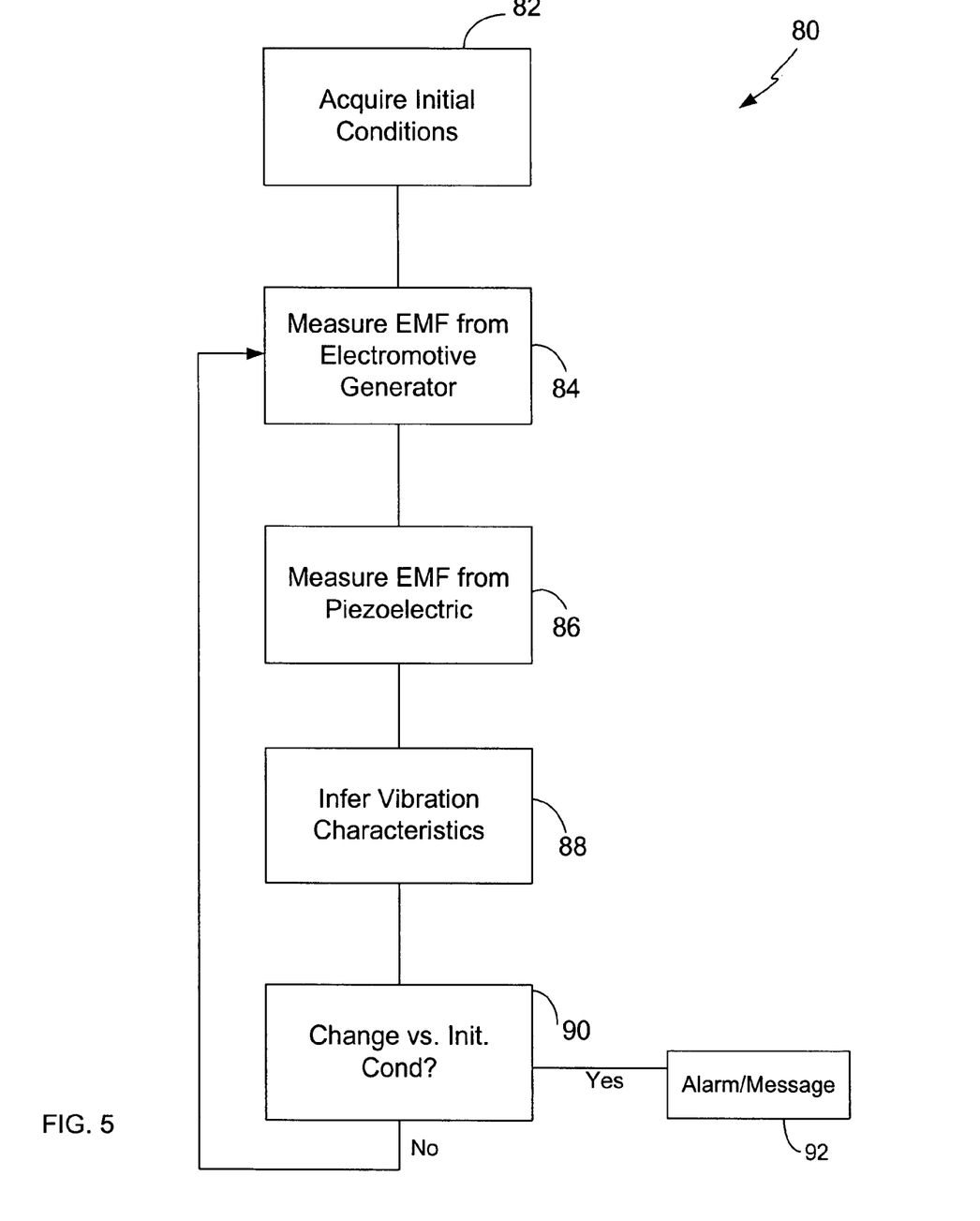
FIG. 5 is a flow diagram of a method of performing vibration-based diagnostics in accordance with an embodiment of the present invention.

FIG. 5 is a flow diagram of a method of performing vibration-based diagnostics in accordance with an embodiment of the present invention. Method 80 begins at block 82 where initial conditions relative to the vibrational source are required. The acquisition of initial conditions can simply be performed when the device is first commissioned, when the vibration-machinery is started, or simply during programming or maintenance. After block 82, control passes to block 84 where the generator determines, or otherwise measures, electromotive force from the electromotive generator. Control then passes to block 86 where electromotive force from the piezoelectric generator is measured, or otherwise determined. At block 88, at least one characteristic of the vibration is inferred from the measured quantities described with respect to blocks 84, 86. Exemplary vibration characteristics include frequency, amplitude, maximum amplitude, as well as changes to such quantities. At block 90, the system determines whether the vibrational characteristics have changed relative to the initial conditions acquired at block 82. If such a change has not occurred, monitoring continues by returning to block 84. However, if such a change has occurred, control passes to block 92 and an alarm, or other suitable message is generated. Examples of suitable alarms/messages include audible or visual alarms locally annunciated from the dampener, messages transmitted wirelessly through an attached device (such as wireless communicator 70). Such alarms/messages can alert an operator of the vibration-generating machinery that some condition has occurred that may merit an examination of the machinery.

Figure 6:
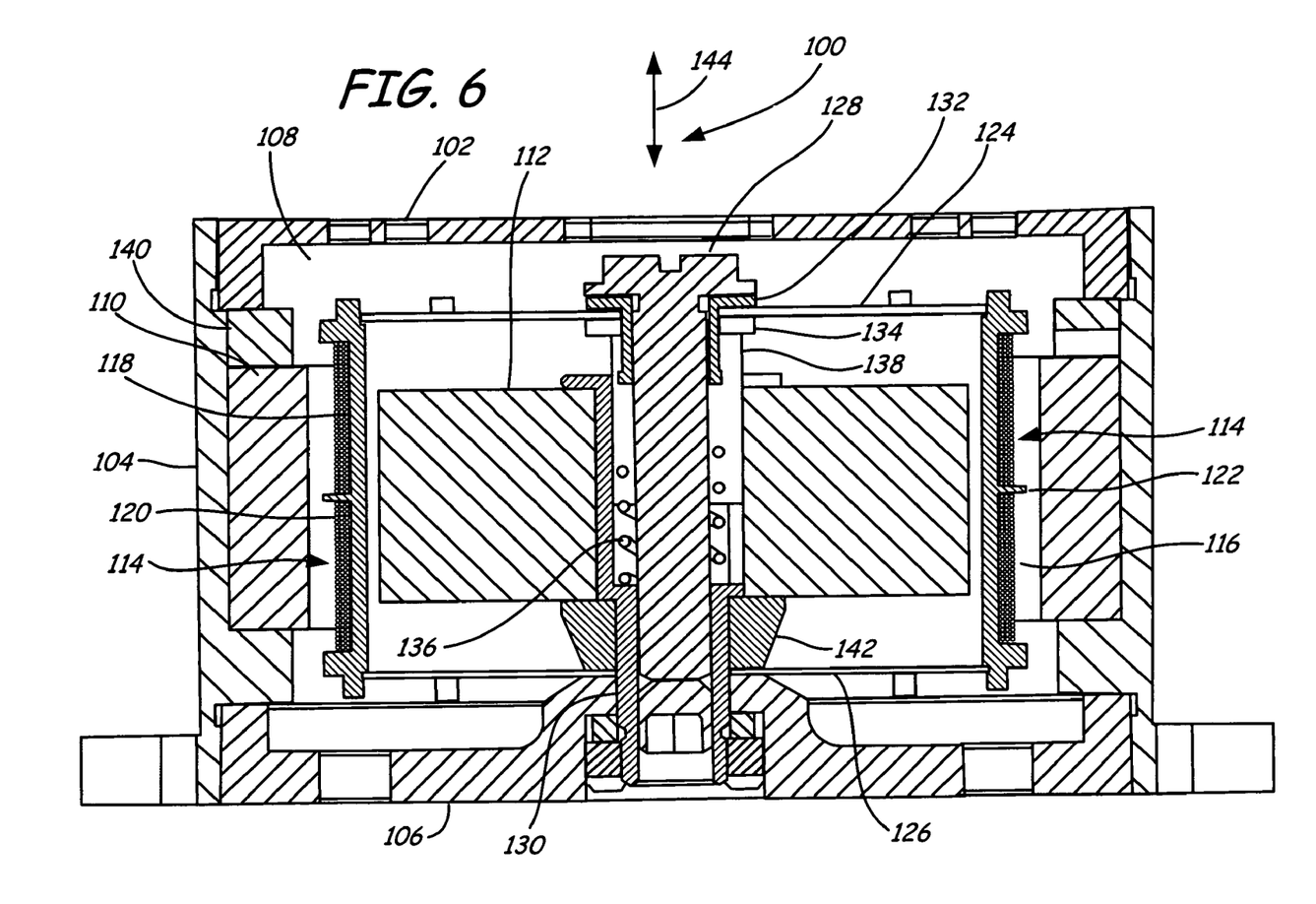
FIG. 6 is a cross sectional view of a electromotive vibration-based generation device in accordance with an embodiment of the present invention.

FIG. 6 is a cross sectional view of a electromotive vibration-based generation device in accordance with an embodiment of the present invention. Device 100 may be embedded within a dampener, or simply attached to a vibration source to generate electricity based upon the vibration. In this embodiment, device 100 includes top cover 102, housing 104, and bottom cover 106. Covers 102, 106 and housing 104 cooperate to form a chamber 108 inside. Device 100 includes a pair of permanent magnets, 110, 112 that are preferably donut-shaped and mounted concentrically with magnet 112 disposed within magnet 110. A voice coil 114 is disposed within annular space 116 between magnets 110, 112. The pair of ring-type permanent magnets, 110, 112 provides a high density transverse radial flux. Magnets 110, 112 are preferably formed of Neodymium Iron Boron (NdFeB). Such magnets can operate at degrees of 120° C. and produce the most powerful magnetic properties per cubic centimeter currently known. However, any other suitable material, whether now known, or later developed, exhibiting permanent magnetic properties can be used. Voice coil 114 preferably has a first portion 118 and a second portion 120 that are separated from one another by ridge 122. Voice coil portions 118, 120 are preferably wound in opposite directions and are electrically cascaded together. First voice coil portion 118 cuts flux in the upper pair of poles between magnets 110, 112, while second voice coil portion 120 cuts flux in the lower pair of poles. Accordingly, the length of the wire within the voice coil portions and the poles are fully utilized. The voice coil portions 118, 120 can work in any orientation, and move and cut flux in both sides of magnets 110, 112 to produce voltages across the coil portions. Voice coil portions 118, 120 are suspended by a pair of flat springs 124, 126. Each flat spring 124, 126 preferably has a plurality (such as three) of curved cantilever beams with large aspect ratios to guarantee that the moving direction is relatively perpendicular to the spring surface. One advantage provided by this orientation is that the assembly becomes compact, with a reduced part count. Additionally, large bi-directional deflections of the voice coil portions are possible. Further still, the arrangement reduces friction, wear and noise as well as provides self-alignment. It is believed that the assembly will be inexpensive to fabricate and easy to calibrate while providing less sensitivity to variations in assembly.

Device 100 preferably includes flat spring tension screw 128 that engages internally threaded magnet retainer 130. Flat spring tension screw 128 bears against flat spring 132 and flat washer 134. By adjusting flat spring tension screw 128, the resonance frequency can be tuned to a specific frequency over a relatively wide range by changing the tension on the flat springs. A coil spring 136 bears against flat spring tension screw 128 that is disposed within magnet retainer 130. Electrical contacts relative to voice coil portions 118, 120 are preferably effected proximate the head of flat spring tension screw 128. Device 100 also includes a slip nut 138 disposed around flat spring tension screw 128, which slip nut 138 bears against coil spring 136. In order to properly space the components within device 100, spacers 140 and 142 are employed. However, other suitable spacers or arrangements can be used in accordance with embodiments of the present invention.

Device 100 is expected to be relatively maintenance free and provide high reliability. Additionally, no external electrical power and wiring is required. Further, the device can be electrically coupled to any suitable electrical device, such as process control and monitoring field devices available from Rosemount, Inc., of Chanhassen, Minn. It is believed that device 100 can work in practically any orientation, however, it is preferred that the primary axis of the vibration be relatively aligned with axial axis 144 such that voice coil portions 118 and 120 derive maximum movement from the vibration. Using any suitable circuitry, various output levels can be provided, such outputs include 9 volt/4 mA, 5 volt/2 mA, and 3 volt/300 µA simultaneously for two seconds in a five minute cycle. Such power outputs provide adequate power for the duty cycle of a complete wireless sensor node. Peak DC output voltage for device 100 is believed to be on the order of 50 volts, 8 milliamps for an approximate ten minute cycle. Maximum power output is believed to be approximately 40 milliwatts and has an energy density of 4.2 milliwatts per cubic inch at an input vibration of 45 Hz and an amplitude of 50 micrometers.

Although the present invention has been described with reference to preferred embodiments, workers skilled in the art will recognize that changes may be made in form and detail without departing from the spirit and scope of the invention.

What is claimed is:

1. A hybrid vibration-based power generator comprising:
   an electromotive power generation module;
   a second power generation module, that converts power differently than the electromotive power generation module;
   a power storage device operably coupled to the electromotive power generation module and the second power generation module; and
   wherein the device is embodied within a machine dampener.

2. The device of claim 1, wherein the device is embodied within a piston-type machine dampener.

3. The device of claim 1, wherein the device is embodied within a bar-type machine dampener.

4. The device of claim 1 and further comprising an additive electrical circuit interposed between the power storage device and the generation modules, wherein the additive electrical circuit is configured to provide an additive signal to the power storage device.

5. The device of claim 4, and further comprising a step-up voltage converter disposed between the additive electrical circuit and the power storage device.

6. The device of claim 1, wherein the device is configured to provide an indication relative to a characteristic of vibration.

7. The device of claim 6, wherein the indication is also a diagnostic indication relative to a source of vibration.

8. The device of claim 6, wherein the characteristic is amplitude.

9. The device of claim 6, wherein the characteristic is frequency.

10. The device of claim 1, wherein the second generation module is a piezoelectric generation module.

11. The device of claim 1, wherein the second generation module is a thermal generation module.

12. The device of claim 1, wherein the machine dampener couples a vibration source to a floor.

13. The device of claim 1, wherein a power-up threshold is associated with the power storage device.

14. The device of claim 13, wherein an attached device is selectively powered up based at least in part upon the power-up threshold.

15. The device of claim 14, wherein the power-up threshold is based at least in part upon an amount of stored energy.

16. The device of claim 14, wherein the power-up threshold is based at least in part upon a pre-selected amount of time.

* * * * *